(12) United States Patent
Sinn et al.

(10) Patent No.: US 9,383,947 B2
(45) Date of Patent: Jul. 5, 2016

(54) PRINTING DIGITAL IMAGES USING AN IMAGE PRINTING SYSTEM

(71) Applicant: Adobe Systems Incorporated, San Jose, CA (US)

(72) Inventors: Richard Sinn, Milpitas, CA (US); Robert Tyler Voliter, Brisbane, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 14/243,658

(22) Filed: Apr. 2, 2014

(65) Prior Publication Data

US 2015/0286444 A1 Oct. 8, 2015

(51) Int. Cl.
*G06F 15/00* (2006.01)
*G06F 3/12* (2006.01)

(52) U.S. Cl.
CPC ............ *G06F 3/1204* (2013.01); *G06F 3/1268* (2013.01); *G06F 3/1288* (2013.01); *G06F 3/1292* (2013.01)

(58) Field of Classification Search
None
See application file for complete search history.

(56) References Cited

U.S. PATENT DOCUMENTS

| | | | |
|---|---|---|---|
| 8,418,068 B1* | 4/2013 | Backus et al. | 715/748 |
| 2003/0059111 A1* | 3/2003 | Druitt et al. | 382/173 |
| 2007/0195361 A1* | 8/2007 | Tomomatsu | 358/1.15 |
| 2012/0317409 A1* | 12/2012 | Revel et al. | 713/150 |
| 2013/0036155 A1* | 2/2013 | Shaw et al. | 709/202 |
| 2013/0232239 A1* | 9/2013 | Akiyama | 709/220 |
| 2013/0239003 A1* | 9/2013 | Usenko et al. | 715/733 |
| 2013/0329245 A1* | 12/2013 | Nishida | G06K 15/4095 358/1.14 |
| 2014/0040811 A1* | 2/2014 | Brahmanapalli | 715/781 |
| 2014/0223574 A1* | 8/2014 | Margalit et al. | 726/27 |
| 2014/0245130 A1* | 8/2014 | Ferreira et al. | 715/234 |

* cited by examiner

*Primary Examiner* — Helen Q Zong
(74) *Attorney, Agent, or Firm* — Keller Jolley Preece

(57) ABSTRACT

The present disclosure is directed toward printing of digital images with increased efficiency and ease. In particular, one or more embodiments provide an image printing system that allows a user to print images from a mobile or other device without having to upload a high-resolution version of the digital images to a print vendor. More specifically, one or more embodiments of the image printing system allow users to store images on a remote server or in a cloud storage space. When the users desire to print physical copies of the digital images, the image printing system can provide the digital images to a print vendor without requiring the users to upload the images to the print vendor from the users' own device.

18 Claims, 12 Drawing Sheets

PRINTING DIGITAL IMAGES USING AN IMAGE PRINTING SYSTEM

BACKGROUND

1. Technical Field

One or more embodiments of the present invention relate generally to systems and methods for printing images. More specifically, one or more embodiments of the present invention relate to systems and methods of printing images stored in a cloud storage medium.

2. Background and Relevant Art

Many mobile devices (e.g., smartphones, tablets) provide users the ability to take and store digital images. Occasionally, a user may want a tangible copy of a digital image or photograph. Traditional methods of printing photographs from a mobile device suffer from a number of disadvantages. For example, typically a user must first upload a full resolution version all of the desired digital images to a print vendor from the user's mobile device. The user can then order prints or copies of the uploaded digital images from the print vendor.

Unfortunately, uploading the digital images from a mobile device generally requires either a wireless data connection or the use of the cellular data. Cameras and other image capturing devices on smartphones and tablets are continually improving, and the quality and size of images captured with those mobile devices is also increasing. Each image may be several megabytes, so uploading more than one full-resolution digital image can be inconvenient or cost prohibitive for users. For example, uploading 100 digital images of approximately 5 megabytes each would use approximately 500 megabytes of data. Even uploading a smaller number of digital images could take up a significant amount of the user's data usage limit, particularly if done several times in a month. As such, a user may prefer, or be required, to have a wireless Internet connection before uploading or ordering prints of digital images.

Furthermore, some mobile operating systems can block or inhibit the user from performing other tasks on the mobile device while images are being uploaded. For example, a user uploading images to a print vendor from the user's mobile device may be unable to upload/download anything else until the images are completely uploaded. Additionally, download and/or processing speeds may be limited while the images are being uploaded, which may slow down other applications on the user's mobile device. Still further, depending upon the number of digital images the user desires to print, uploading the digital images can take a significant amount of time. The hassle of uploading digital images can cause users to abandon the print process or otherwise be dissuaded from printing images.

If more than one user wants to order prints of a shared or distributed image, typically each user needs to separately upload the image to a print vendor. Alternatively, shared images may first need to be downloaded to a single device before being uploaded to the print vendor. As such, current mobile printing options may limit the options users have to print shared digital images to printing from the same vendor or having each user upload the desired digital images.

These and other disadvantages may exist with respect to printing digital images, particularly when printing from a mobile device.

SUMMARY

One or more embodiments of the present invention provide benefits and/or solve one or more of the foregoing or other problems in the art with systems and methods of printing images using a remote server or a cloud storage space. In particular, the remote server or a cloud storage space can store high-resolution digital images associated with a user of a mobile device. The remote server or a cloud storage space can allow the user to print images from a mobile device without having to upload a high-resolution digital image to a print vendor. More specifically, the remote server or a cloud storage space can act as an intermediary between the mobile device and the print vendor and provide the high-resolution images to the print vendor.

Thus, one or more embodiments described herein provide features that improve printing physical copies of photographs of digital images. For example, one or more embodiments can reduce or avoid data usage typically associated with printing digital images from a mobile device. Additionally, by providing digital images directly to a print vendor, the remote server or a cloud storage space can allow users to continue using their devices without experiencing network and/or processor latency associated with uploading potentially large amounts of data from the user's device.

In some embodiments, the remote server or a cloud storage space can provide a shared space to which more than one user may contribute. Each image uploaded to the shared space for the group may be accessible to each of the other users within the group. For example, the remote server or cloud storage can sync low-resolution versions of each of the images in the shared space across the devices of the users in the group. In one embodiment, a user may print a physical copy of an image without ever downloading a high-resolution copy of the image to the user's device. The print vendor may obtain the high-resolution image directly from the remote server or a cloud storage space. This enables the user to print the high-resolution image without having to download the high-resolution image from the cloud storage space or without having to upload the high-resolution image from the user's device to the print vendor. In addition, because a plurality of users may contribute to a group event managed by the remote server or cloud storage space, a user may be able to print any of the images captured or uploaded by any of the other users.

Additional features and advantages of the present invention will be set forth in the description which follows, and in part will be obvious from the description, or may be learned by the practice of such example embodiments. The features and advantages of such embodiments may be realized and obtained by means of the instruments and combinations particularly pointed out in the appended claims. These and other features will become more fully apparent from the following description and appended claims, or may be learned by the practice of such example embodiments as set forth hereinafter.

BRIEF DESCRIPTION OF THE DRAWINGS

In order to describe the manner in which the above-recited and other advantages and features of one or more embodiments of the invention may be obtained, a more particular description of one or more embodiments of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope of the claims or the invention, several embodiments of the invention will be described and explained with additional specificity and detail through the use of the accompanying drawings in which:

DETAILED DESCRIPTION

The present disclosure is directed toward printing of digital images with increased efficiency and ease. In particular, one or more embodiments provide an image printing system that allows a user to print images from a mobile or other device without having to upload a high-resolution version of the digital images to a print vendor. More specifically, one or more embodiments of the image printing system allow users to store images on a remote server or in a cloud storage space. When the users desire to print physical copies of the digital images, the image printing system can provide the digital images to a print vendor without requiring the users to upload the images to the print vendor from the users' own device (e.g., a mobile device).

Thus, one or more embodiments described herein provide features that improve printing physical copies of photographs of digital images. In particular, one or more embodiments of the image printing system can reduce or avoid the time and data usage typically associated with uploading digital images from a mobile device. Additionally, by providing digital images to a print vendor from a cloud storage space, one or more embodiments can allow users to continue using their devices without experiencing network and/or processor latency associated with uploading potentially large amounts of data from the users' devices.

In some embodiments, the image printing system can provide a shared space to which more than one user may contribute. Each image uploaded to the shared space for the group may be accessible to each of the other users within the group. In one embodiment, a user may print a physical copy of an image taken by another user without ever downloading a high-resolution copy of the image to the user's device. The print vendor may obtain the high-resolution image directly from the image printing system. This enables the user to print the high-resolution image without having to download or upload the high-resolution image. In addition, because a plurality of users may contribute to a group event managed by the image printing system, a user may be able to print any of the images captured or uploaded by any of the other users to the image printing system.

Furthermore, one or more embodiments of the image printing system can allow the individual users of a group to select their desired or preferred print vendor. For example, a user can form a group associated with an event, such as a wedding, to which photos of various attendees of the wedding can be uploaded to the image printing system. The image printing system can allow the various users to select various print vendors to print images from the event.

Figure 1:
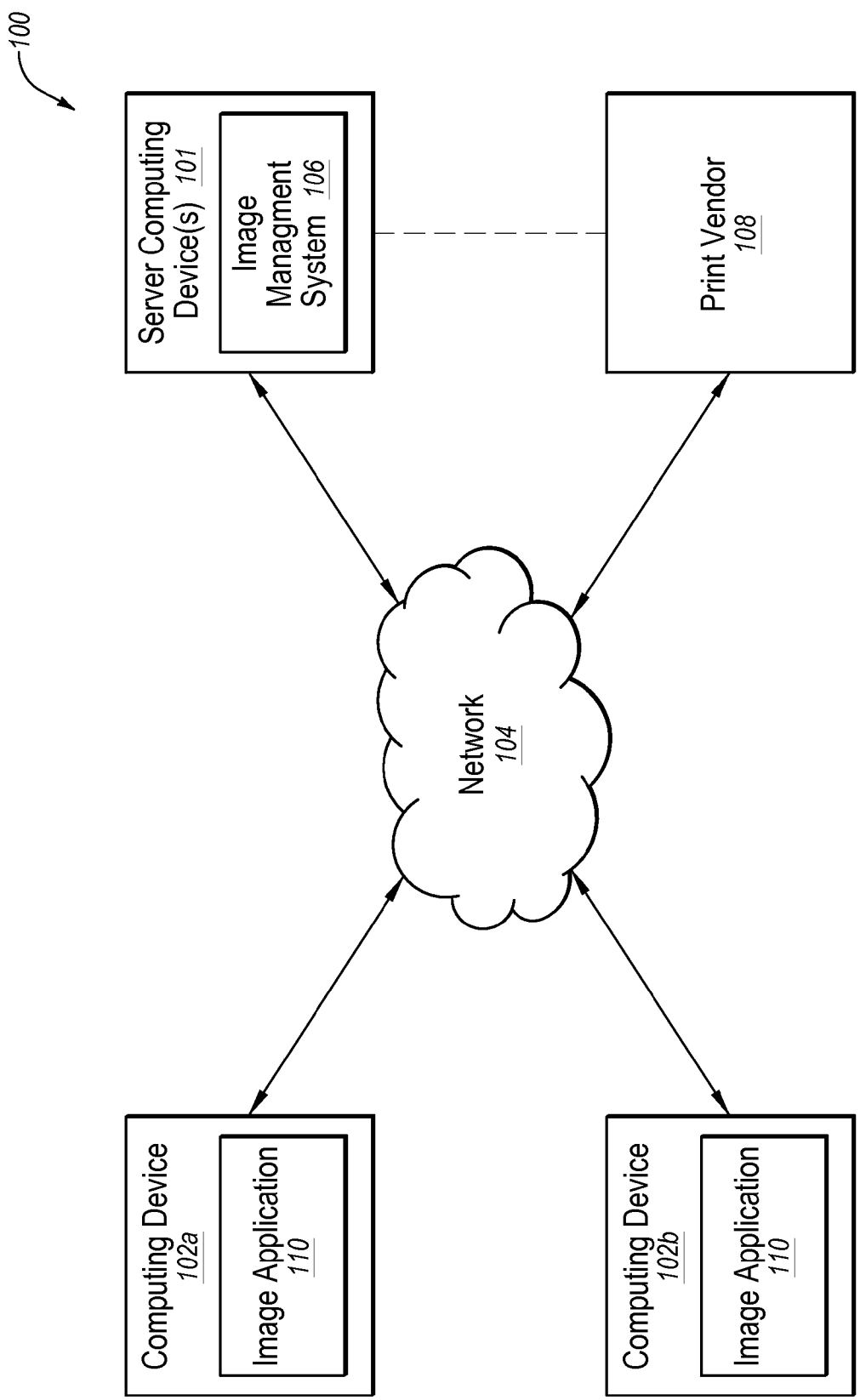
FIG. 1 illustrates a schematic overview of a system in accordance with one or more embodiments of the present invention.

FIG. 1 illustrates an embodiment of an exemplary image printing system 100 (or simply "system 100"). As shown, the system 100 may include, but is not limited to an image application 110, an image management system 106, and a print vendor 108. A network 104 may communicatively couple the components of the system 100. As shown, image application 110 can implemented on, or by, computing devices 102a, 102b (also referred to herein as client devices). Similarly, the image management system 106 can be 106 implemented on, or by, server computing device(s) 101 (also referred to herein as server(s)). The components of the system 100 may function to facilitate printing of images without requiring an upload of the images from a device (i.e., computing devices 102a, 102b) requesting the printing of the images. Although FIG. 1 illustrates a particular arrangement of the computing devices 102a, 102b, the network 104, the image management system 106, and the print vendor 108, various additional arrangements are possible. For example, the computing devices 102a, 102b may directly communicate with the image management system 106, bypassing the network 104.

The image management system 106 can receive high-resolution images from the image application 110 and send or sync a low-resolution image to one or more of the computing devices 102a, 102b. As used herein, the term "low-resolution image" refers to an image with a lower resolution than a "high-resolution image." In particular, a "low-resolution image" can include an image generated by reducing the resolution or quality of a "high-resolution image." More particularly, in one or more embodiments a "low-resolution image" can comprise a thumbnail image (e.g., about 75×75 pixels) or a full screen image for a hand-held device (e.g., about 150×150 pixels). In one or more embodiments a "low-resolution image" has a resolution less than about 250 kilo-pixels. Alternatively, a "low-resolution image" can have a resolution between about 2.5 kilo-pixels and about 250 kilo-pixels.

As used herein, the term "high-resolution image" refers to an image with a higher resolution than a "low-resolution image." A high-resolution image can have a resolution sufficiently high to allow for quality printing. For example, in one or more embodiments a "high-resolution image" can have a resolution of greater than about 250 kilo-pixels. Furthermore, in one or more embodiments a "high-resolution image" can comprise a full or original resolution image (i.e., a resolution as originally captured). In still further embodiments a "high-resolution image" can have a resolution greater than a full or original resolution due to one or more modifications or enhancements.

The image management system 106 may store high-resolution images on a server or in a cloud storage space that is separate from a user's computing device 102a, 102b. Additionally, the image management system 106 can provide low-resolution images corresponding to any stored high-resolution images. One will appreciate in light of the disclosure herein that the image management system 106 can thus free up space on the computing devices 102a, 102b.

For example, a user can capture high-resolution images with a computing device 102a, 102b. The image application 110 can transfer the high-resolution images to the image management system 106. The image management system 106 can provide the computing device 102a, 102b with a corresponding low-resolution image. The user, if desired, can then delete the high-resolution images from the computing device 102a, 102b to free up storage space and allow for the local storage of more images. As the high-resolution images are stored by the image management system 106, the user can access or download them at later time if desired. Alternatively, the user can leave the high-resolution image on the computing device 102a, 102b.

Along related lines, the image management system 106 can sync low-resolution images across multiple computing devices associated with a user or a group of users. For example, the image management system 106 can send a low-resolution image to a user's phone, tablet, and laptop or other device in which the user has installed the image application 110. Thus, the image management system 106 can allow the user to access and view the low-resolution image more readily.

Furthermore, the image management system 106 can allow a user to create a group event and invite other users to participate in the group event. When a user takes a photograph or otherwise adds a high-resolution image to the group event, the image application 110 can send the high-resolution image to the image management system 106. The image management system 106 can then send a corresponding low-resolution image to each group participant. Thus, the image management system 106 can allow multiple users at a common event, such as a wedding or other party, to share images.

The image management system 106 may receive a request from a computing device 102a, 102b to print the high-resolution image using a print vendor 108. One will appreciate that a high-resolution image selected for printing by a user operating a particular computing device 102a, 102b may or may not be present on the computing device 102a, 102b. For example, a first user may desire to print a high-resolution image taken by another group participant or a high-resolution image previously deleted from the user's computing device. In any event, the image management system 106 may provide the high-resolution image the print vendor 108. Thus, the image management system 106 can allow a user to select and print high-resolution images without having to upload the images directly to the print vendor 108. The print vendor 108 can print the high-resolution images obtained from the image management system 106 and provide them to the user. For example, the user can go to a brick and mortar store associated with the print vendor 108. Otherwise, the print vendor 108 can mail the image prints to the user.

Each user may interact with one of the computing devices 102a, 102b for the purpose of generating, browsing or navigating electronic communications (e.g., photographs and other images) and/or content associated with the electronic communications. The users may interact with the computing devices 102a, 102b by way of a user interface of the image application 110. In some embodiments, an instance of the image application 110 may run on each of the computing devices 102a, 102b used to access or interact with the image management system 106. For example, users interacting with the image management system 106 may utilize the image application 110 to cause the computing devices 102a, 102b to capture, browse, download, upload, alter, print, or otherwise modify and/or interact with images stored locally on the computing devices 102a, 102b and/or on the image management system 106.

The image management system 106 may store, receive, modify, and transmit content, such as photographs, images, image metadata, user interaction information, vendor information or other content generated or sent by the users or otherwise associated with the users or print vendors 108. Images stored locally and/or in a cloud storage space associated with the image management system 106 may be displayed in the user interface on the corresponding computing device 102a, 102b. Images and other data may be received by the image management system 106 and sent to other computing devices 102 for viewing, browsing, or printing by other users.

For example, when the image management system 106 receives a high-resolution image, the image management system 106 can, without human intervention, enhance the image. In particular, the image management system 106 can sharpen, deblur, perform a red-eye reduction, lighten, darken, or otherwise enhance the image. In alternative embodiments, the user can prompt or instruct the image management system 106 to enhance an image. For instance, the user can select an enhance option (e.g., red-eye reduction) using the image application 110. The image application 110 can then communicate the request to the image management system 106, which can then perform the requested enhancement to the high-resolution version of the image stored by the image management system 106.

As used herein, the terms "cloud storage space" and "cloud" may refer generally to a storage medium that provides access to content stored thereon from one or more devices over a network connection or other Internet connection. In some embodiments, the cloud storage space is distributed across one or more servers 101 for storing one or more types of content. For example, the cloud storage space may store digital content from more than one application, including the image content (e.g., digital photographs and other digital image content), in one or more physical locations in a distributed server environment. The cloud storage space may also be accessible to more than one user—for example, to more than one user of an image application 110.

In certain embodiments, the cloud storage space may refer generally to a server or cluster of servers for storing any amount or type of content accessible to any user with access to the image management system 106. In other embodiments, the cloud storage space may refer to a space on one or more servers designated for use by a particular group of users or for a specific set of images associated with a group event within the image management system 106. The image management system 106 may include or be associated with more than one cloud storage space. Each cloud storage space may accessible to a particular set of users of the image management system 106. For example, each cloud storage space may be designated for use by a set of users based on access given to the users from an owner of the group event (or "group"). The group owner may create the group to store images relating to a particular event (e.g., a wedding, a graduation ceremony, or any other event) for which a plurality of photographs may be taken. Alternatively, the group owner may create a group to store images relating to a particular category of images (locations, dates, subject matter of the images, etc.). In other examples, a group may relate to any type or set of images.

In some embodiments, a particular user may have access to more than one cloud storage space. For example, a user may be a group owner of more than one group, and each group may be associated with a different cloud storage space. Alternatively, a user may be invited to be a contributing user of more than one group by the corresponding group owners. In certain embodiments, group owners may be able to configure certain aspects of the group (e.g., deleting or renaming the group), while contributing users may have a limited set of configuration or interaction options for the group (e.g., uploading images or removing images uploaded by the user requesting to remove the images).

The system 100 may also include one or more print vendors 108. As used herein the term "print vendor" refers to an entity that provides the service of printing images. A print vendor can comprise a brick and mortar store or an Internet service that prints and mails the images to the users. The print vendor 108 can comprise a third-party entity that is separate from the image management system 106 as shown by FIG. 1. Alternatively, the print vendor 108 can be integrated with the image management system 106.

Although FIG. 1 illustrates only one print vendor 108, it is understood that the system 100 may include a plurality of print vendors 108 interacting with the image management system 106. Accordingly, the image management system 106 may enable a user to select from the plurality of print vendors 108 when printing a particular photograph or image. Additionally, each print vendor 108 may interact with the image management system 106 for the purpose of retrieving high-resolution images and purchaser information for printing physical copies of the high-resolution images at a particular store or printing site associated with the selected print vendor 108.

Figure 2:
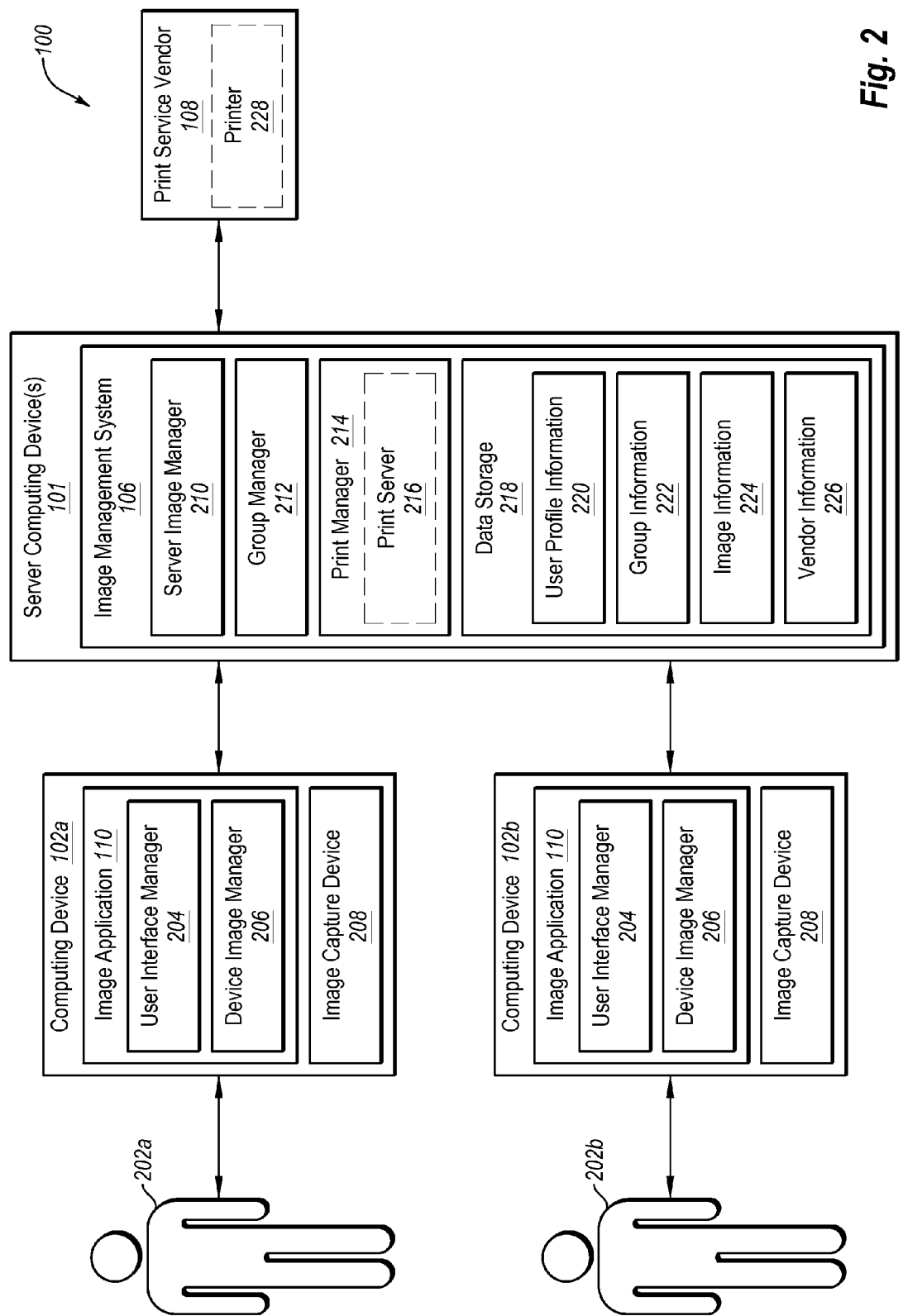
FIG. 2 illustrates a detailed schematic diagram of an image application, an image printing system, and a print vendor of the system of FIG. 1 in accordance with one or more embodiments of the present invention.

FIG. 2 illustrates additional details of the image printing system 100 of FIG. 1. As shown, the image application 110 includes a user interface manager 204, a device image manager 206, and an image capture device 208. The image management system 106 includes a server image manager 210, a group manager 212, a print manager 214, and data storage 218. It will be recognized that although the components 204-206 of the image application 110 are shown to be separate in FIG. 2, any of components 202-206 may be combined into fewer components, such as into a single component, or divided into more components as may serve a particular implementation. Similarly, while the components 210-226 of the image management system 106 are shown to be separate in FIG. 2, any of components 210-226 may be combined into fewer components, such as into a single component, or divided into more components as may serve a particular implementation.

The components 202-206 and 210-226 can comprise software, hardware, or both. For example, the components 202-206 and 210-226 can comprise one or more instructions stored on a computer-readable storage medium and executable by processors of one or more computing devices. When executed by the one or more processors, the computer-executable instructions of the image application 110 can cause the computing device(s) 102a, 102b to perform the various acts of the methods described herein. Similarly, when executed by the one or more processors, the computer-executable instructions of the image management system can cause the server computing device(s) 101 to perform various acts of the methods described herein. Alternatively, the components 202-206 and 210-226 can comprise hardware, such as a special purpose processing device to perform a certain function or group of functions. Additionally or alternatively, the components 202-206 and 210-226 can comprise a combination of computer-executable instructions and hardware.

Referring now specifically to each of the components, the user interface manager 204 can provide a graphical user interface (such as those shown and describe below in reference to FIGS. 3-5D) with which a user can perform one or more actions (e.g., to interact with features of the application). To illustrate, the user interface manager 204 can provide a user interface through which a user can capture, browse, upload, download, orders prints, or otherwise interact with images and other content.

Additionally, the user interface manager 204 may facilitate interaction by a user with one or more users. For example, the user interface manager 204 can provide one or more options for a first user 202a of an image management system 106 to share images with a second user 202b of the image management system 106. As described in more detail below, each user may interact with other users via the image application 110 on the corresponding computing devices 102a, 102b. To illustrate, the first user 202a may communicate with the image management system 106 via the image application 110 running on a first computing device 102a. The first user 202a may use the image application 110 on the first computing device 102a to capture and upload images to the image management system 106.

The image management system 106 can then sync, share, transfer, or provide access to images provided by the first user 202a to the second user 202b. For example, the image management system 106 can send a low-resolution image (or a high-resolution image) to the second computing device 102b. The second user 202b may access or interact with images stored by the image management system 106 via the image application 110 running on the second computing device 102b.

The image application 110 may also include a device image manager 206 to facilitate management of images on the computing device 102a, 102b. For example, the device image manager 206 can store at the computing device 102a, 102b information corresponding to any images available for viewing by the user within the image application 110. Images accessible to the user via the image application 110 may include high-resolution images stored locally on the computing device 102a, 102b and low-resolution images corresponding to high-resolution images stored remotely by the image management system 106. The device image manager 206 may maintain storage information for the images accessible on the computing device—including a physical location of locally stored high-resolution images and low-resolution images—as well as authentication information for interfacing with the image management system 106.

In some embodiments, each computing device 102a, 102b may include an image capture device 208 (e.g., a camera) for capturing images to store on the computing device 102a, 102b and/or to store remotely with the image management system 106. In other embodiments, images may be captured and/or stored on the computing device 102a, 102b by any other means. For example, the user may capture images with a separate device and transfer the images to the computing device 102a, 102b at a separate time. In another example, the user may first download images to the computing device 102a, 102b from a browser or other application before uploading the images to the image management system 106.

As mentioned, the image management system 106 can store images uploaded by users from the various computing devices 102a, 102b in a cloud storage space. The image management system 106 may include a server image manager 210 to facilitate management of images in the cloud storage space or on any storage medium accessible to more than a computing device 102a, 102b. For example, the server image manager 210 can store information corresponding to any images uploaded by any user to the cloud storage space and/or corresponding to any designated group of users or images. The images stored by the image management system 106 may include high-resolution images as well as low-resolution images corresponding to the high-resolution images. The server image manager 210 may also manage storage information and/or other information related to the images stored in the cloud storage space, as described in more detail below.

The image management system 106 may include a group manager 212 to facilitate management of group events associated with one or more users and/or one or more computing devices 102. For example, the group manager 212 may manage the groups associated with each user. To illustrate, the group manager 212 may maintain a list or mapping of groups and the corresponding users based on the users' account or authentication information. The group manager 212 may also manage a list or mapping of images associated with each group, which may be used in conjunction with the mapping of groups to users to determine whether a particular user has access rights to a particular image. As groups are created or deleted and as images are added to or removed from a particular group, the group manager 212 may update the mappings for the corresponding groups and users to ensure that a particular user is able to access all of the images corresponding to the user's groups and only the images corresponding to the user's groups.

Additionally, the group manager 212 may manage the rights associated with the groups. For example, when a group owner creates a group via the image application 110 on a computing device 102, the group manager 212 may receive the information from the computing device 102 and map the group owner to the group. The group owner may have high rights to the group and any images associated with the group, such that the group owner may access any images associated with the group or perform a range of actions associated with the group (e.g., upload images to the group, print images, modify images, and/or delete the group or particular images from the group).

If the group owner designates other users as contributing users, the contributing users may have limited rights to the group. For example, a contributing user may have rights to upload any images to the image management system 106 for the group, but a contributing user may only be able to delete or remove images from the group if the contributing user uploaded the image to the image management system 106. In other embodiments, contributing users may only upload images to the group and print images associated with the group, but may not remove any uploaded images. In certain embodiments, the group owner and/or the contributing users may revoke personal access to a given image (i.e., remove the image from the group as presented on their own computing device) without removing the image from the group.

The image management system 106 may also include a print manager 214 to facilitate printing images from the image management system 106 to a print vendor 108. For example, the print manager 214 may allow the print vendor 108 to access the images from the image management system 106 rather than requiring the print vendor 108 to obtain the images from the requesting computing device 102a, 102b. The print manager 214 may allow the print vendor 108 to access the high-resolution images in any way that allows the print vendor 108 to obtain the images from the cloud storage space. For example, the print manager 214 may associate a uniform resource locator (URL) with each image selected for printing to the print vendor 108 and store the corresponding URLs in a list of URLs. The URLs may be used in any type of suitable file transfer protocol or communication method for accessing the corresponding high-resolution images. The print manager 214 can send the list of URLs to the print vendor 108, which may then use the URLs to retrieve the corresponding high-resolution images. A URL allows the print vendor 108 to access the corresponding high-resolution image without providing specific server authentication information to the print vendor 108. Thus, in one or more embodiments the URL can indicate a location of a high-resolution image in the cloud storage (i.e., in one of the one or more server computing devices 101 or in the data storage 218).

One will appreciate that the image management system 106 can control the distribution of high-resolution images. In one or more embodiments, the image management system 106 can control the distribution of high-resolution images by making the URLs valid for a certain predetermined amount of time. For example, the image management system 106 can cause the URLs to expire after a given period of time.

Alternatively, the image management system 106 can transfer the high-resolution image to a new location (such as on the print server 216) to facilitate the transfer of the images to the print vendor 108. The image management system 106 can generate a URL that indicates the new location of the high-resolution image. The image management system 106 can send the uniform resource locator to the print vendor 108. After a predetermined amount of time, the image management system 106 can delete or remove any images from the location indicated by the URL.

In other instances, the print manager 214 may provide an authentication token to be used by the print vendor 108 to access the high-resolution images. In one embodiment, the print manager 214 associates a token with a location of a high-resolution image and sends the token to the requesting computing device 102a, 102b in response to a print request from a requesting computing device 102. The requesting computing device 102a, 102b then sends the token to the print vendor 108 via a connection established between the computing device 102a, 102b and the print vendor 108. The authentication token may allow the print vendor 108 to authenticate with the image management system 106 to obtain the high-resolution images from the image management system 106. The token can comprise a random string that acts as a pointer to the location of the images to be printed.

In certain embodiments, the print manager 214 may include a print server 216 that is separate from the cloud. The print server 216 may be communicatively coupled to the cloud servers for fast access to the data stored in the cloud. For example, the print server 216 may be communicatively coupled to the cloud servers via an internal network. When a user requests a print order for a particular image or set of images, the print server 216 contacts the cloud to obtain the URLs or other location information for the high-resolution images and transmits the location information for the images to the print vendor 108. The print server 216 may be configured to obtain print order information or other print details from the user for the corresponding images to transmit to the print vendor 108 for completing the print order. The print server 216 may perform any of the functions associated with the print manager 214 in various embodiments. While the print manager 214 in FIG. 2 includes a print server 216, some or all of the functionality described relative to the print server 216 in FIG. 2 may be performed by other components in the image management system 106.

The print manager 214 may also be configured to perform error correction without any intervention from the user. For example, if the print manager 214 encounters an error that stops the print order while attempting to contact the print vendor 108, the print manager 214 may automatically reinitiate the attempt to contact the print vendor 108. To illustrate, if the print manager 214 attempts to send a list of URLs to the print vendor 108 while the print vendor 108 is unavailable, the print manager 214 may continue attempting to send the list of URLs to the print vendor 108 until the print vendor 108 becomes available or until a certain number of attempts has been reached. In some embodiments, the URLs are temporary URLs that are only valid for a predetermined amount of time or number of attempts. If a particular print request is unable to be completed for any reason, the print manager 214 may send a failure message to the requesting computing device 102a, 102b.

The image management system 106 may also include data storage 218 to facilitate the storage of data corresponding to images, users, transactions, and components in the cloud. For example, the data storage 218 may store user profile information 220, group information 222, image information 224, and vendor information 226, described in more detail below. The data storage 218 may also store any additional or alternative information corresponding to the operation of the image management system 106 or the system 100. The data storage 218 may be configured to maintain additional or alternative data as may serve a particular implementation. The data storage 218 may communicate with any component within the system 100 to obtain information for storing, managing, and printing images associated with the image management system 106. In one embodiment, the data storage 218 includes one or more servers on which high-resolution images are stored. For example, the data storage 218 may include in a cloud storage.

The user profile information 220 may include identification information corresponding to each of the users with access to the image management system 106. For example, the user profile information 220 may include account information, authentication information, personal identification information, and/or other information related to the users.

The group information 222 may include information related to any groups associated with the image management system 106. For example, the group information 222 may include names, labels, images, group owners, contributing users, access rights, and/or other information related to the groups.

The image information 224 may include information related to images within the image management system 106. For example, the image information 224 may include storage location, resolution, storage size, owner information, image metadata, upload information and/or other information related to the images stored in the cloud including the actual images. The image information 224 may also include information relating to low-resolution images of corresponding high-resolution images in the image management system 106.

The vendor information 226 may include information corresponding to one or more print vendors 108 associated with the image management system 106. For example, the vendor information 226 includes contact information, geographical location information for particular vendor stores, print requirement information, color profile information corresponding to particular printers 228 used by the vendors 108, and/or other information corresponding to the print vendors 108.

In one implementation, a color profile includes information corresponding to a configuration of a particular printer, specifically for a particular vendor 108. The color profiles for each print vendor 108 may be stored in a database of color profiles. Each print vendor 108 may use a specific type and model of the printer 228. Each printer 228 may produce physical prints using a specific configuration of colors based on the model, the ink used, and the way in which the printer 228 performs. By providing the color profile information specific to a particular print vendor 108 in a print request, the image management system 106 may be able to provide the best quality print for the corresponding vendor 108 without any required interaction or configuration by the user.

In another embodiment, the color profile may be used to automatically modify any images included in a print request to enhance the quality of the physical print. For example, the image management system 106 may adjust a brightness of the images or modify colors in the images based on the print vendor 108 and/or printer 228 being used. Additionally or alternatively, the image management system 106 may provide other image enhancements or modifications (e.g., redeye removal), either automatically in the image application 110 or based on input from a user via the image application 110.

In some embodiments, the system 100 includes a plurality of print vendors 108 from which the user may select within the image application 110. Each print vendor 108 may be associated with a plurality of stores able to print a particular high-resolution image. For example, a selected print vendor 108 may be a national chain with a plurality of associated franchises from which the user may select within the image application 110 when submitting a print request. After a store is selected and the print request is completed, the selected store may print one or more physical prints of the high-resolution image at a printer 228.

Figure 3:
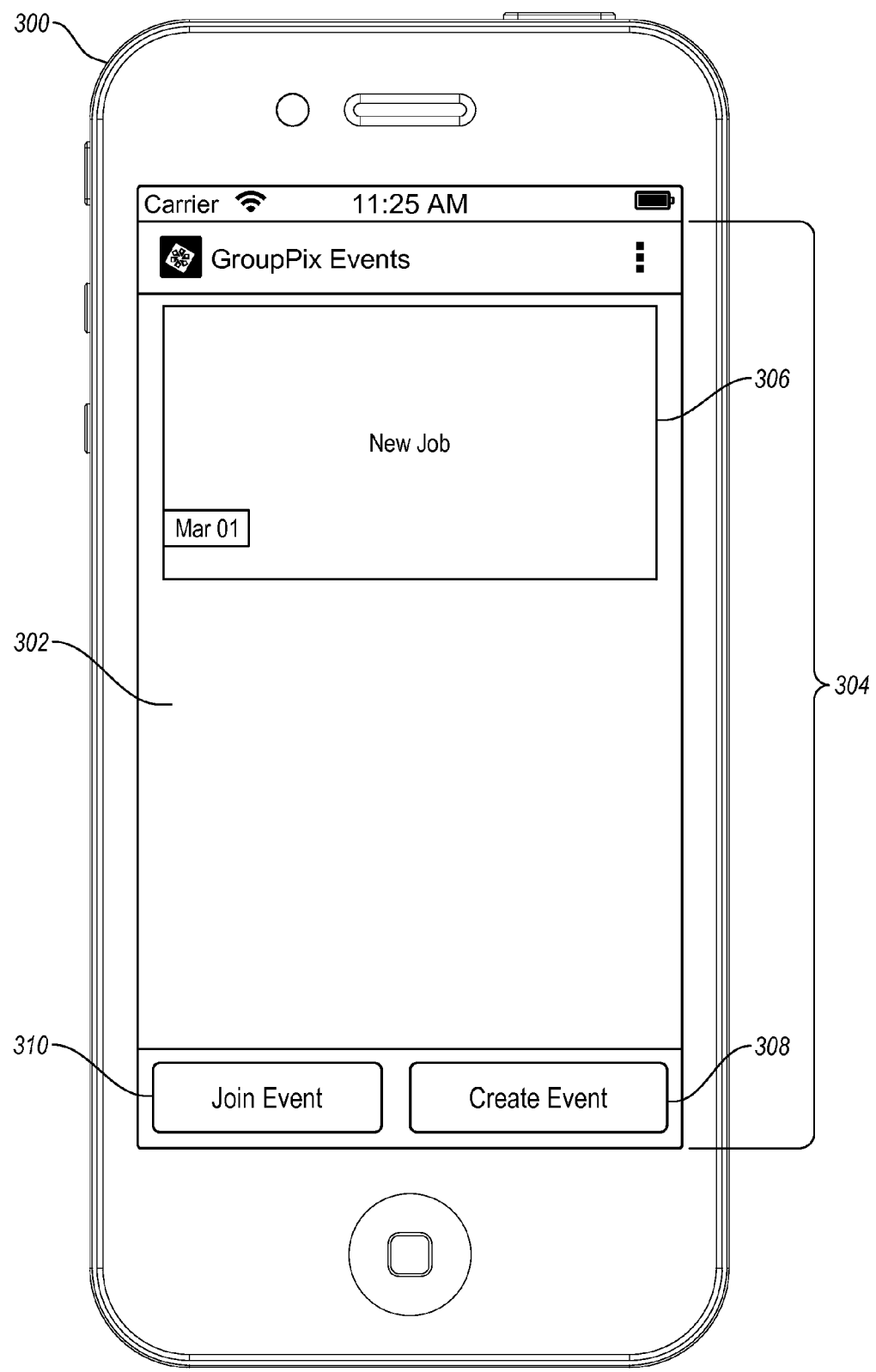
FIG. 3 illustrates a computing device displaying a group event user interface in accordance with one or more embodiments of the present invention.

In some examples, the system 100 may be implemented partially or entirely on a computing device 300. FIG. 3 illustrates an example view of an image application 110 executing on a computing device 300. As shown, the image application 110 may run on a mobile computing device such as a smartphone. In other implementations, the image application 110 may be implemented by any other suitable computing device, such as, but not limited to, a tablet device, a handheld device, a laptop or desktop computer, a personal-digital assistant device, and/or any other suitable computing device capable of implementing one or more of the processes and/or operations described herein. As illustrated in FIG. 3, the computing device 300 may include and/or be associated with a touch screen 302 by way of which a user interface may be presented and/or by way of which user input may be received and/or detected. Additionally or alternatively, the computing device 300 may include any other suitable input device (e.g., a keypad or one or more input buttons).

In some examples, a user may utilize the touch screen 302 to provide one or more touch gestures, interact with a user interface, and/or access content item information. To illustrate, a user may utilize the touch screen 302 to browse, navigate, select, or otherwise interact with content items presented in the user interface. For example, a user may utilize the touch screen 302 to interact with groups and images associated with the groups, capture images, import images from other applications, share images with other users, select images for printing, or other actions related to images and content presented in the user interface.

In particular embodiments, the image application 110 presents a group event user interface 304 displaying group events or groups associated with a particular user. For example, when the user opens the image application 110, the group event user interface 304 displays group events 306 for with the user a group owner or a participant. In one embodiment, the group event user interface 304 displays a name of each group event 306 and a creation date for each group event 306. The group event(s) 306 may be displayed in an order according to creation date. For example, the most recently created group event 306 is displayed at the top of a list of group event(s) 306. Alternatively, the group event(s) 306 may be displayed in any order.

The group event user interface 304 may include a create group element 308 that allows the user to create a new group event 306. When the user selects the create group element 308, the group event user interface 304 may display a prompt with a keyboard interface for the user to enter a name for the new group event 306. In one example, entering a name and creating the new group event 306 may cause the application to display a prompt to add friends or other users to the group event 306 via text or email with an invite identifier, as well as an option to share the group event 306 to the web—which creates a URL for the group event 306 that is accessible outside of the image application 110. If a user selects the web sharing option, the user may be allowed to toggle a new option to allow images from the group event 306 to be downloaded at the web access URL. In other embodiments, the group owner may invite other users to the group event 306 or designate contributing users by using other methods.

The group event user interface 304 may include a join group element 310 that allows the user to join an already existing group event 306. In one embodiment, selecting the join group element 310 causes the group event user interface 304 to display a prompt to enter a group identifier. When the user enters the group identifier to join a particular group event 306, the user becomes a participant of the group event 306. Joining a group event 306 within the image application 110 may allow the user to view, download, and print any of the images already uploaded to the image management system 106, in addition to allowing the user to upload images from the computing device 300.

The user may also be able to perform other actions associated with the group event(s) 306 within the group event user interface 304. For example, the user may open a contextual menu to invite additional users, email a link to the group event 306, edit group information, delete the group event 306, and/or access other application settings or options.

In alternative embodiments the user may elect to be the sole participant in a group event 306. In such embodiments, the user may elect to use the image management system 106 to sync images across multiple client devices 102 or to provide a backup of images in the one or more servers computing devices 201. Thus, while various embodiments are described in relation to groups or group events, a group can comprise a single user.

Figure 4A:
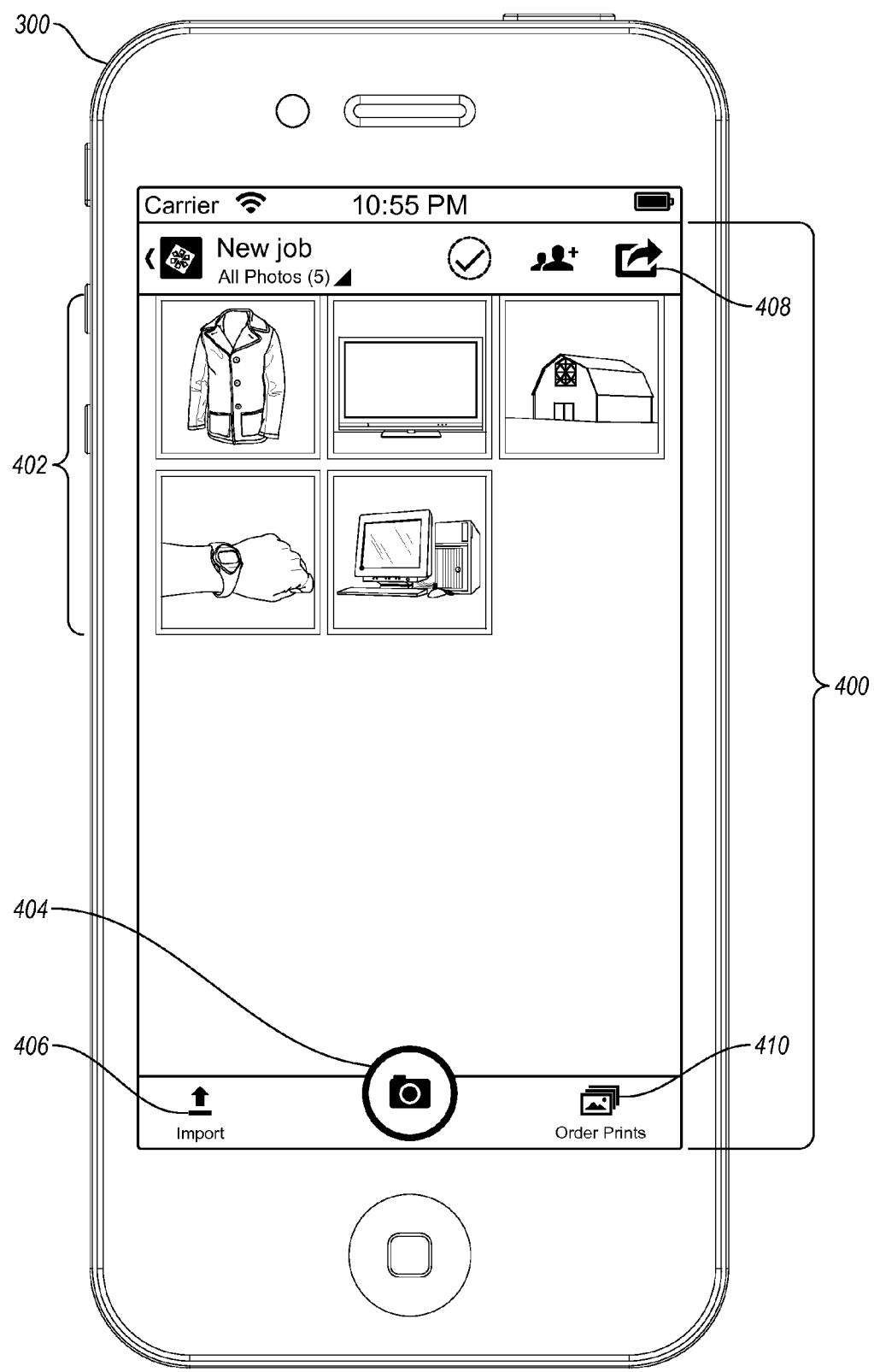
FIGS. 4A-4B illustrate the computing device of FIG. 3 displaying an event content user interface in accordance with one or more embodiments of the present invention.
Figure 4B:
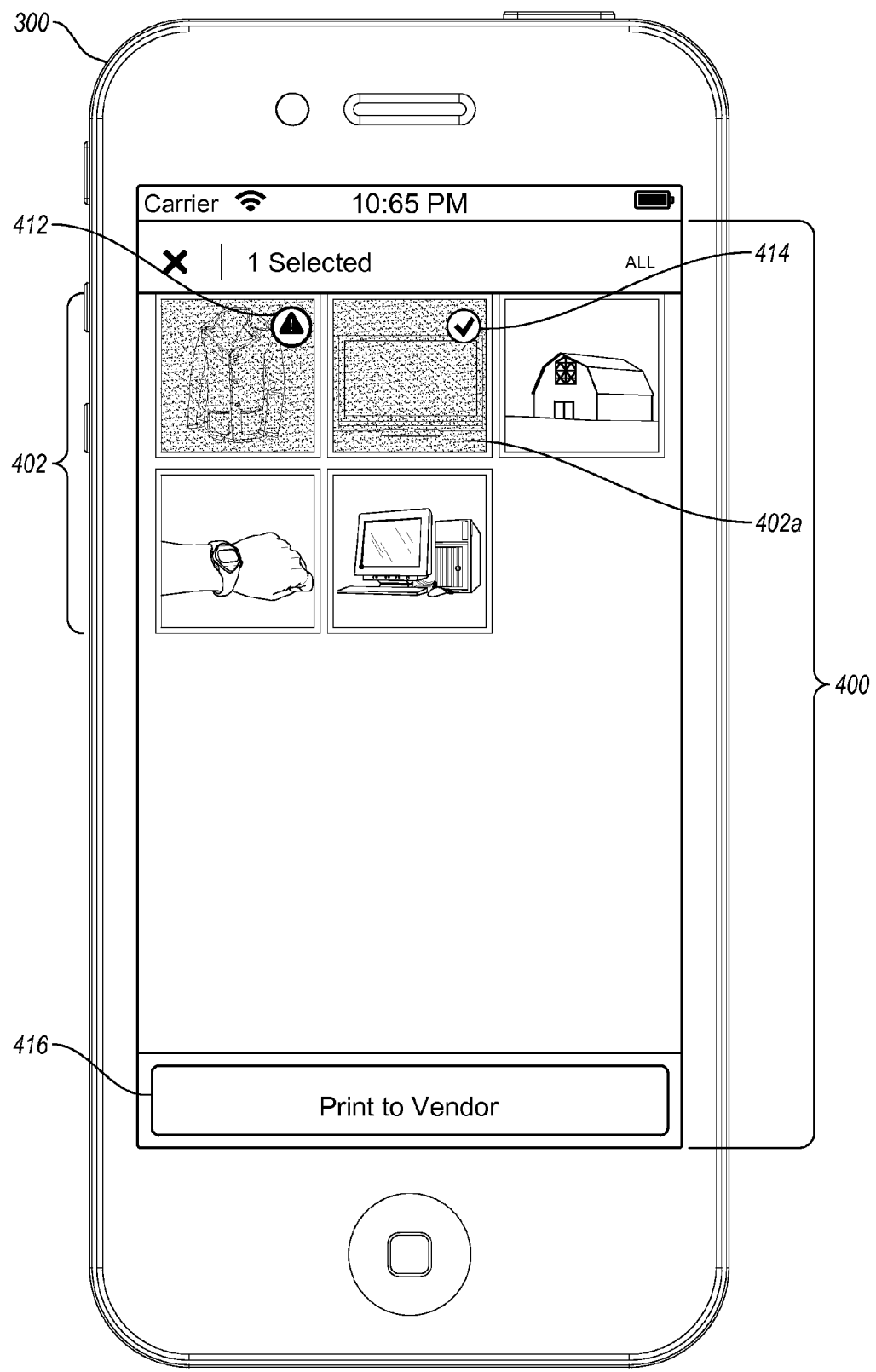

FIGS. 4A-4B illustrate additional example views of an event user interface 400 according to principles described herein. Selecting a particular group event in the group event user interface 304 may open an event user interface 400, as illustrated in FIG. 4A. The event user interface 400 may present low-resolution images (e.g., thumbnails images) 402 associated with a group event in a grid or any suitable configuration for displaying the thumbnails images 402.

In particular, each time a computing device 102 associated with the group event adds an image to the group event, the computing device 102 can upload a high-resolution image to the image management system 106. The image management system 106 can then send a thumbnails image 402 corresponding to the received high-resolution image to computing devices 102 associated with the participants in the group event. As shown by FIG. 4A, the event user interface 400 can display each of the thumbnail images 402 received from the image management system 106.

One will appreciate in light of the disclosure herein that the computing device 300 may or may not have a high-resolution image corresponding to a particular thumbnail image 402. For example, if the user of the computing device 300 captured and added a particular image to the group event, the computing device 300 may have a copy of the high-resolution image stored locally thereon. Alternatively, after uploading the high-resolution image, the user may have deleted the high-resolution image from the computing device 300 to save storage space.

In contrast, at least initially, the computing device 300 may not have high-resolution images added to the group event by other participants in the group. In particular, the computing device 300 can include only the thumbnail images 402 of the high-resolution images stored at the image management system 106. As explained below, if desired, the user can download high-resolution images corresponding to the thumbnails images 402 to the computing device 300.

Upon selecting a thumbnail image 402, the image application 110 may open a full-screen view of the selected thumbnail image 402. Similar to the thumbnail image, the full-screen view can comprise a low-resolution image. In the full screen view, the user may select to add the selected image to a list of favorites. The list of favorites (or "likes") may also be accessed via the event user interface 400—for example, in a dropdown menu—along with additional options to change the layout of the images or sort by various attributes of the images (e.g., "likes", comments or photographer). The full screen view of the selected image may also allow the user to add a comment to the image. Information corresponding to image comments or image favorites may be saved in metadata associated with the image and transmitted to the image management system 106 for storage in the cloud in association with the full-resolution image.

In one or more embodiments, the thumbnail images 402 associated with the group event are displayed in a chronological order according to the time each image was added to the group event. For example, each time a new image is added to the group event, the new thumbnail image 402 is displayed in a top left corner of the event user interface 400. Each thumbnail image 402 already in the group may be shifted so that older thumbnail images 402 are further down in the grid of images. Alternatively, the event user interface 400 can display the thumbnail images 402 in other orders or configurations.

The event user interface 400 may include various icons or available actions to allow the user to interact with the thumbnail images 402 or other elements within the event user interface 400. In some instances, the event user interface 400 may include an image capture element 404 to facilitate capturing images using a built-in camera or other image capture device associated with the computing device 300. Selecting the image capture element 404 may open a camera interface directly in the image application 110 so that the user is not required to open a separate camera application on the computing device 300. Additionally or alternatively, upon selection of the image capture element 404, image application 110 can open a camera roll of the computing device 300 and allow the user to import previously captured images into the group event 110.

In some embodiments, the image application 110 may present a verification user interface to verify that the user wants to save an image captured using to the group event. The verification user interface may display the image and a verification element (such as a check mark and an 'x') to allow the user to select to save or discard the captured image. If the user saves the captured image, a high-resolution version of the image is sent to the image management system 106 and a thumbnail image 402 is added to the list or grid of images in the event user interface 400. If the user discards the captured image, the image is not added to the group event and maybe removed from the computing device 300. After verification, the image application 110 may return to the camera interface to allow the user to continue taking photographs. Alternatively, the image application 110 may return to the event user interface 400 to allow the view the recently captured image and other images associated with the group event.

As shown by FIG. 4A, the event user interface 400 can optionally include an import element 406 to facilitate importing images from a source other than the camera interface into the group. For example, the import element 406 may be used to import locally stored images from the computing device 300. To illustrate, selecting the import element 406 may open or interface with a native camera application of the computing device 300 that allows the user to select images that have been previously captured, downloaded or otherwise transferred to a local storage of the computing device 300.

The user may choose to download the full-resolution images to the computing device 300 by performing an action associated with a selection element 408. Pressing the selection element 408 may allow the user to select the desired thumbnail images 402 and then perform various actions associated with the images. For example, upon pressing the selection element 408, the user may select one or more thumbnail images 402. Upon selecting one or more thumbnail images 402, the image application 110 can provide various options to the users. For example, one option may be to download to the computing device 300 the corresponding full-resolution images from the image management system 106. Alternatively, image application 110 can provide the user the option to delete selected thumbnail images 402 from the group event or from the local storage of the computing device 300. Still further, the image application 110 can provide the user the option to print, email, or otherwise manipulate or share selected thumbnail images or their corresponding high-resolution version.

In one embodiment, the event user interface 400 may include a print element 410 to facilitate printing images from a group event. For example, selecting the print element 410 may allow the user to select from the available thumbnail images, as displayed in FIG. 4B. Images may only be available for printing if the full-resolution images are fully uploaded to the image management system 106. According to one implementation, the image management system 106 retrieves thumbnail images for every image added to the group event and sends the thumbnail images to each user associated with the group event prior to receiving and storing the full-resolution image. This allows the users to quickly see all of the images that have been taken without having to wait for all of the full-resolution images to upload. If a number of users associated with the group event are taking many photographs, uploading the full-resolution images to the image management system may take some time based on the number and size of the images and the upload speeds available to the users. Sending thumbnail images to each of the users can provide a more efficient/immediate way for users to browse the images.

For images that do not have a high-resolution version fully uploaded to the image management system 106, the event user interface 400 may display a warning symbol 412 (such as a exclamation point inside of a triangle) to indicate that the image is not yet available for printing via a print vendor 108. If the full-resolution image is not currently available in the image management system 106, the print vendor 108 will not be able to access the image to complete a print request. This may be especially useful if a particular full-resolution image is never fully uploaded. This may occur, for example, if a user deletes an image before the full-resolution is uploaded, if the user exits the image application 110, if the user loses a data connection, or if the image file is corrupted. Once a user selects an image for printing (e.g., by tapping the thumbnail image), if the image is fully uploaded to the cloud, user interface 400 may display a check mark 414 or other indicator that allows the user to easily see that the selected thumbnail image 402a is selected and available for printing.

In some embodiments, selecting the print element 410 may change other options available to the user within the event user interface 400. For example, selecting the print element 410 may replace other elements in the event user interface 400 with an option to print to a particular print vendor 108. To illustrate, the image capture element 404, the import element 406, and the print element 410 may be replaced by a print request element 416 for the particular vendor 108. In some instances, a vendor selection element may be displayed to allow the user to choose from more than one print vendor 108.

Once the desired images are selected for printing and the print vendor 108 is specified, the user may select the print request element 416 to initiate a transaction with the selected print vendor 108. FIGS. 5A-5D illustrate additional example user interfaces that allow a user to interact with a print vendor 108 during a print request.

In one or more embodiments, in response to a selection of the print request element 416, the computing device 300 sends an indication to the image management system 106 of the thumbnail image(s) 402a selected for printing and a indication of the selected print vendor 108. The indication can comprise the thumbnail of the image or another identifier that allows the image management system 106 to location the high-resolution image corresponding to the selected image thumbnail 402a. At this point, the image management system 106 can provide the high-resolution images corresponding to the selected/indicated thumbnail images 402a to the print vendor 108.

While the image management system 106 initiates a communication session with the selected print vendor 108 to transfer the selected images. The image application 110 may display a message to the user indicating that the session is being initiated, for example, via a loading screen. If the print vendor 108 is unavailable, the image management system 106 may automatically retry an attempt to initiate a communication session with the print vendor 108. For example, the image management system 106 may attempt to initiate a session up to a certain number of attempts.

In some instances, the print vendor 108 retrieves the full-resolution images from the image management system 106 before any print details corresponding to the print vendor 108 are displayed in the image application 110. In other instances, the print vendor 108 retrieves the full-resolution images before any communication between the computing device 300 and the print vendor 108 occurs. In other examples, the print vendor 108 may retrieve some or all information corresponding to the print request at different times during the communication session between the image management system 106 and the print vendor 108. To illustrate, the print vendor 108 may retrieve information corresponding to a quantity of full-resolution images in a print request before print details are presented in the image application 110. The full-resolution images may then be downloaded while a user advances through steps associated with completing the print order with the print vendor 108. In other embodiments, the full-resolution images and associated information may be uploaded to the print vendor 108 from the image management system 106 at any time suitable to a particular embodiment.

In any event, the image application 110 can initiate a transaction with the print vendor 108. For example, the image application 110 can display an order info iframe 501a from the print vendor 108. For example, the image application can call an application-programming interface (API) of the print vendor 108 that can allow the image application 110 running on the computing device 300 to communicate directly with the print vendor 108. Alternatively, the communication session may be initiated using other methods as benefits a particular embodiment.

Figure 5A:
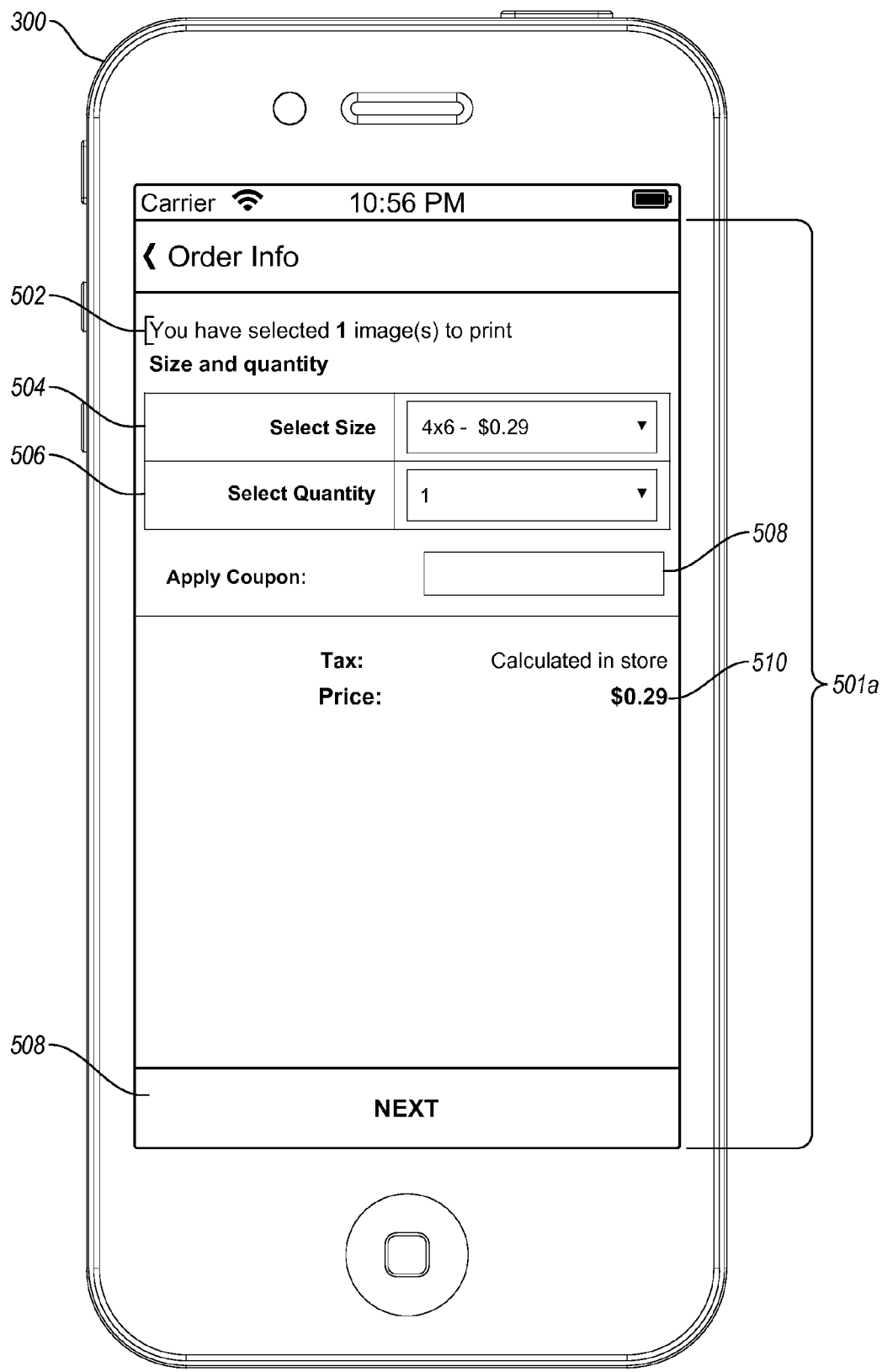
FIGS. 5A-5D illustrate the computing device of FIG. 3 displaying user interfaces for ordering prints of digital images using an image printing system in accordance with one or more embodiments of the present invention.

As shown by FIG. 5A, the order info iframe 501a may present the number 502 of images selected for printing and various printing options available to the user. In some embodiments, the options may include a printing size 504 (e.g. 4 inch×6 inch) and a quantity 506 of the physical prints. In some instances, the options may allow a user to select only one size for all prints in the print request. In other instances, the options may allow a user to select more than one size for different prints.

The order info iframe 501a may also include a coupon field 508 to allow the user to apply a coupon or promotional code to the order. As the size and quantity options are updated, the order info iframe 501a may display price information 508 for the current print request based on the currently selected options. In some embodiments, the available sizes and costs may vary from one print vendor 108 to another. Additionally, some print vendors 108 may specify a limit to the quantity of physical prints that may be selected in a single print request or for a single user. The limit may be different for each print vendor 108.

Figure 5B:
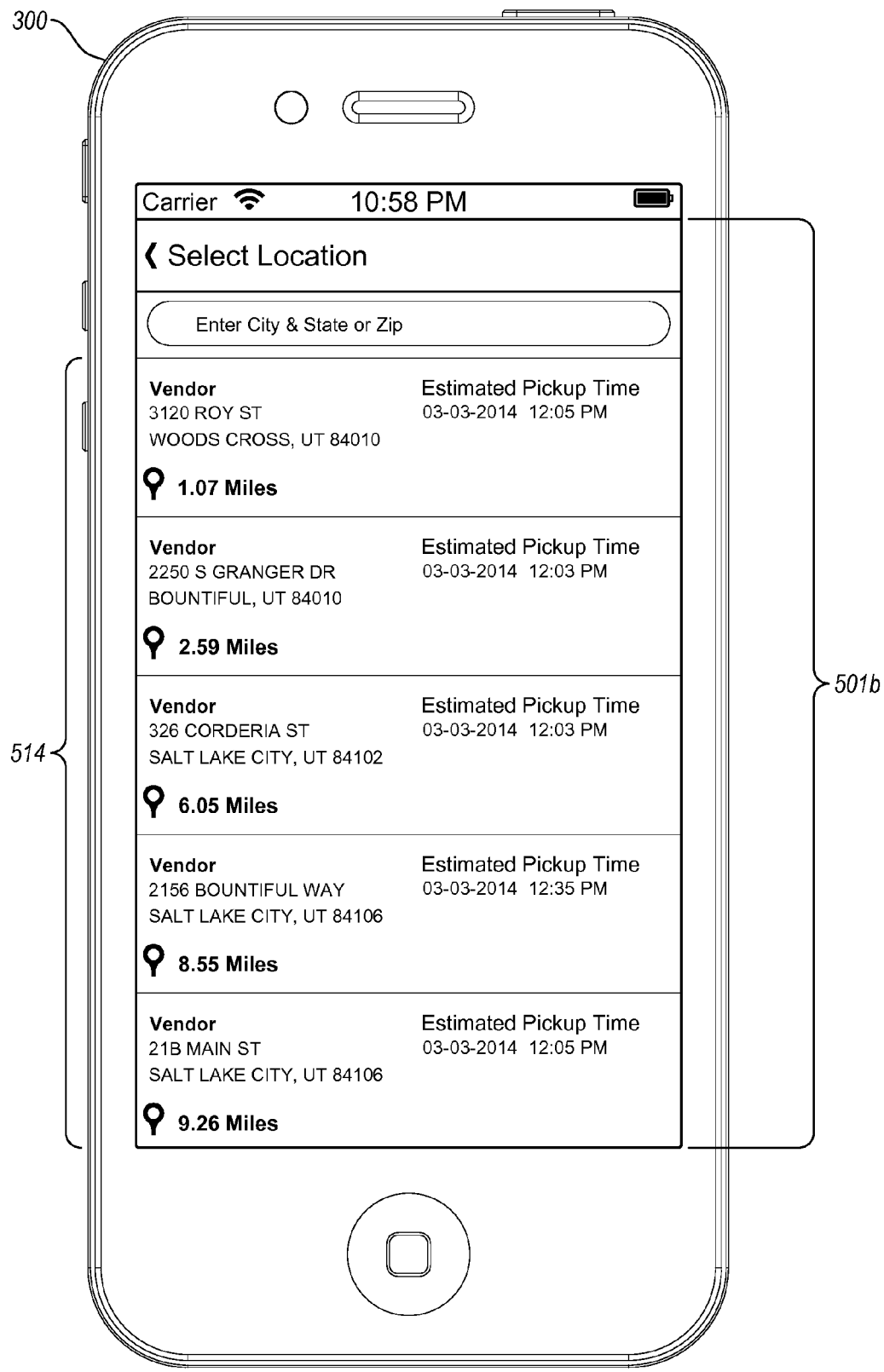

After a next option 508, the computing device 300 can send the information entered in the order info iframe 501a to the print vendor 108. The computing device 300 can then display a select location iframe 501b including a list of physical stores 514 associated with the print vendor 108, as shown in FIG. 5B. The select location iframe 501b may present the physical stores in an ordered list 514 based on a location of the computing device 300. For example, the image application 110 may transmit location data to the print vendor 108 to allow the print vendor 108 to display the stores closest to the user's current location. In another example, the user may enter location information (e.g., city, state, zip code) to obtain a list of the closest stores to that location. Alternatively, the list of physical stores may be displayed according to a user preference or user history. The list of physical stores may be displayed according to any other order according to the particular embodiments.

The list of physical stores in the select location iframe 501b may present information corresponding to each of the stores. For example, the list of physical stores may include the address of each store and a distance from the user's current location based on the location data obtained by the print vendor 108. The list of physical stores may also include an estimated pickup time. The estimated pickup time may be based on the print order information, including the current time, the quantity of images, and the size of the images. The estimated pickup time may also be based on an available capacity of the particular store—for example, if a particular store has many print requests in a queue of print requests, the store may have a longer wait time.

Figure 5C:
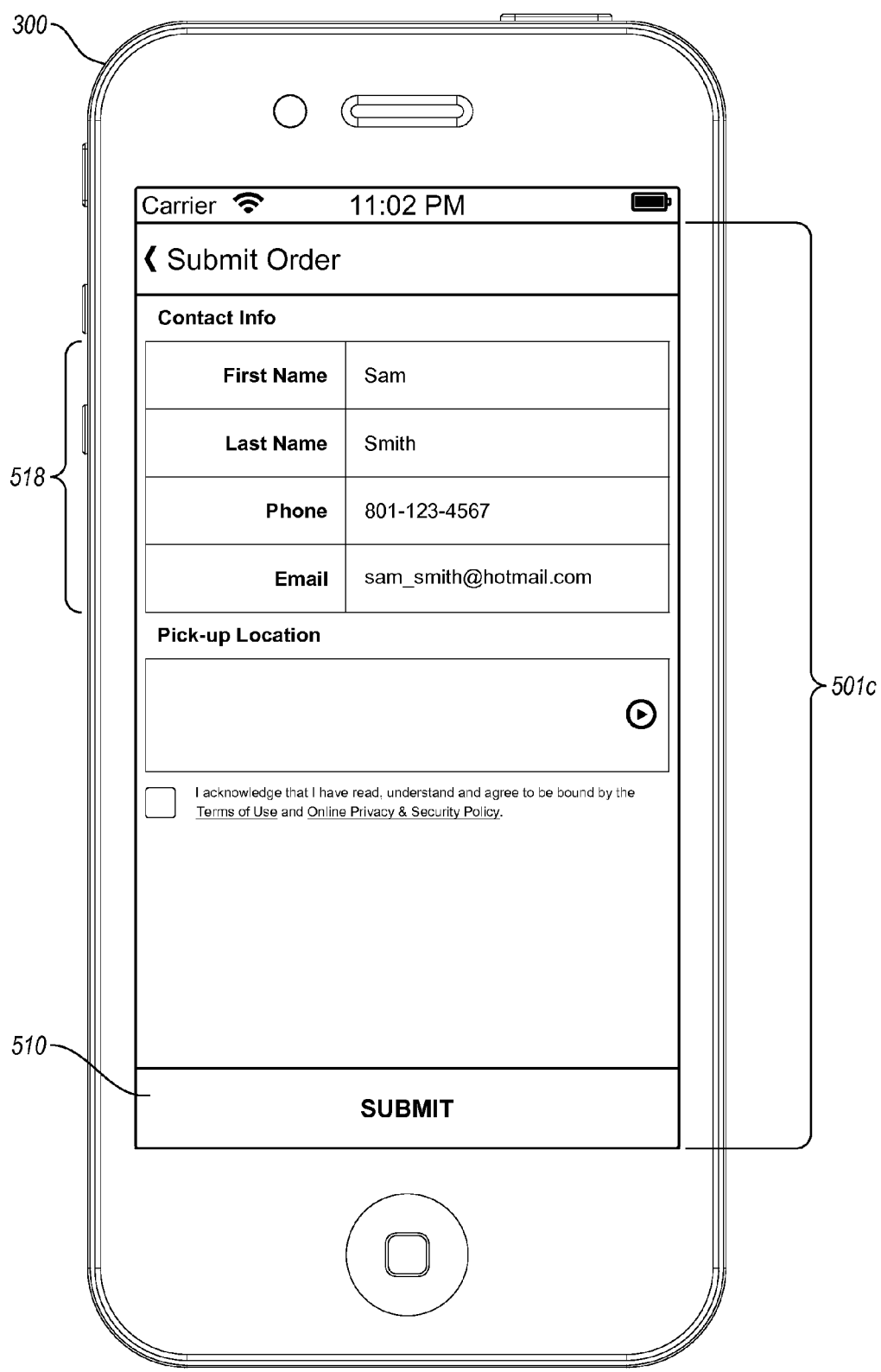

Upon the user selecting a physical store, the computing device 300 can display a submit order iframe 501c, as illustrated in FIG. 5C. The submit order iframe 501c may include fields for inputting user information 518 about the user submitting the print request. The type or amount of information required to complete the print request may vary based on the print vendor 108 specified in the print request.

In some embodiments, at least some of the fields may be pre-populated based on information associated with the user's account with the image management system 106. For example, the print request may require the user to input a first name, a last name, a phone number, and an email address before the user is able to complete and submit the print request. If the user has already provided one or more of the requested information items when establishing an account with the image management system 106, the image application 110 may pre-populate the corresponding fields with the provided information. To illustrate, if the user provided a first name, a last name, and an email address, the corresponding fields may be pre-populated with the associated information. The user may be required to fill in the remaining information (e.g., the phone number) before being able to submit the print request.

The submit order iframe 501c shown in FIG. 5C may also include other information, such as the selected location and the estimated pick-up time. In one example, submit order iframe 501c may require the user to agree to terms of use associated with the particular vendor 108 before being able to submit the print request.

In one implementation, the print vendor 108 does not require the user to input any financial or payment information. For example, the print vendor 108 to allow the user to print to the print vendor 108 without providing payment upon submission, and only require payment upon pick-up of the physical prints. This allows the user to print without being required to pay if the user cannot pick up the prints for any reason. In other embodiments, the print vendor 108 may require the user to input financial/payment information before submitting a completed print request.

Figure 5D:
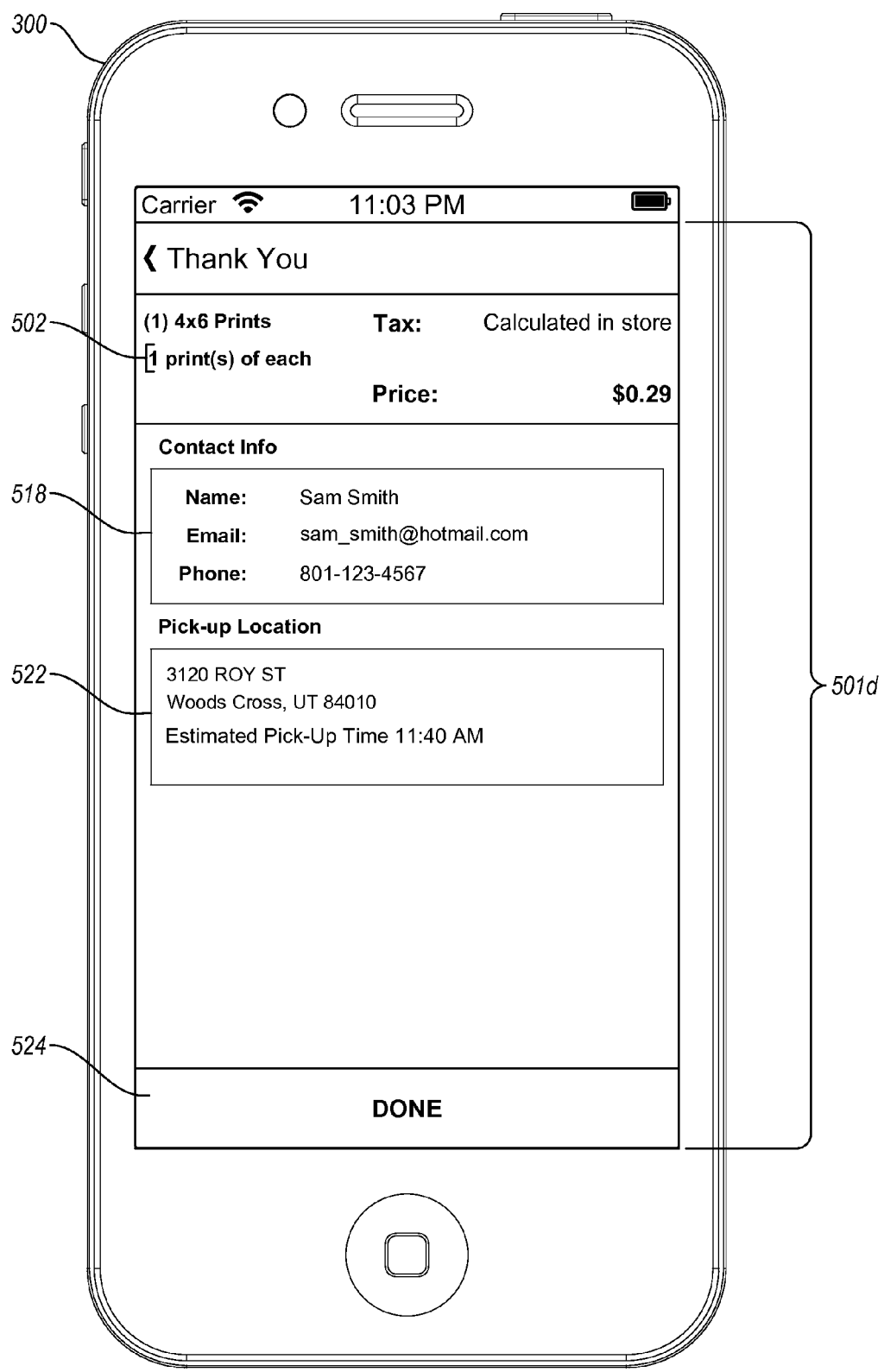

After selection of a submit option 510, the computing device 300 can send the information entered in the submit order iframe 501c to the print vendor. The computing device 300 can then display an order completion iframe 501d, as illustrated in FIG. 5D. The order completion iframe 501d may present at least some of the print details input by the user and/or associated with the particular print order, including the number of prints requested, the pricing information 508 for picking the prints up from the store, user information 518, and the pick-up location (store) information 522. After reviewing the print details, the user may select an option 524 to return to the group event user interface 304 of the image application 110.

In some embodiments, print details may be stored in the system 100 for use with later print requests. For example, the system 100 may store previous orders for re-printing at a later time. Additionally or alternatively, the system 100 may maintain a selection of the particular vendor 108 and/or store so that the user may easily be able to order physical prints from the same store if the store is most convenient. Other or additional information related to the image application 110 and/or print orders may be stored by the system 100, either in the cloud or on the computing device 102.

Figure 6:
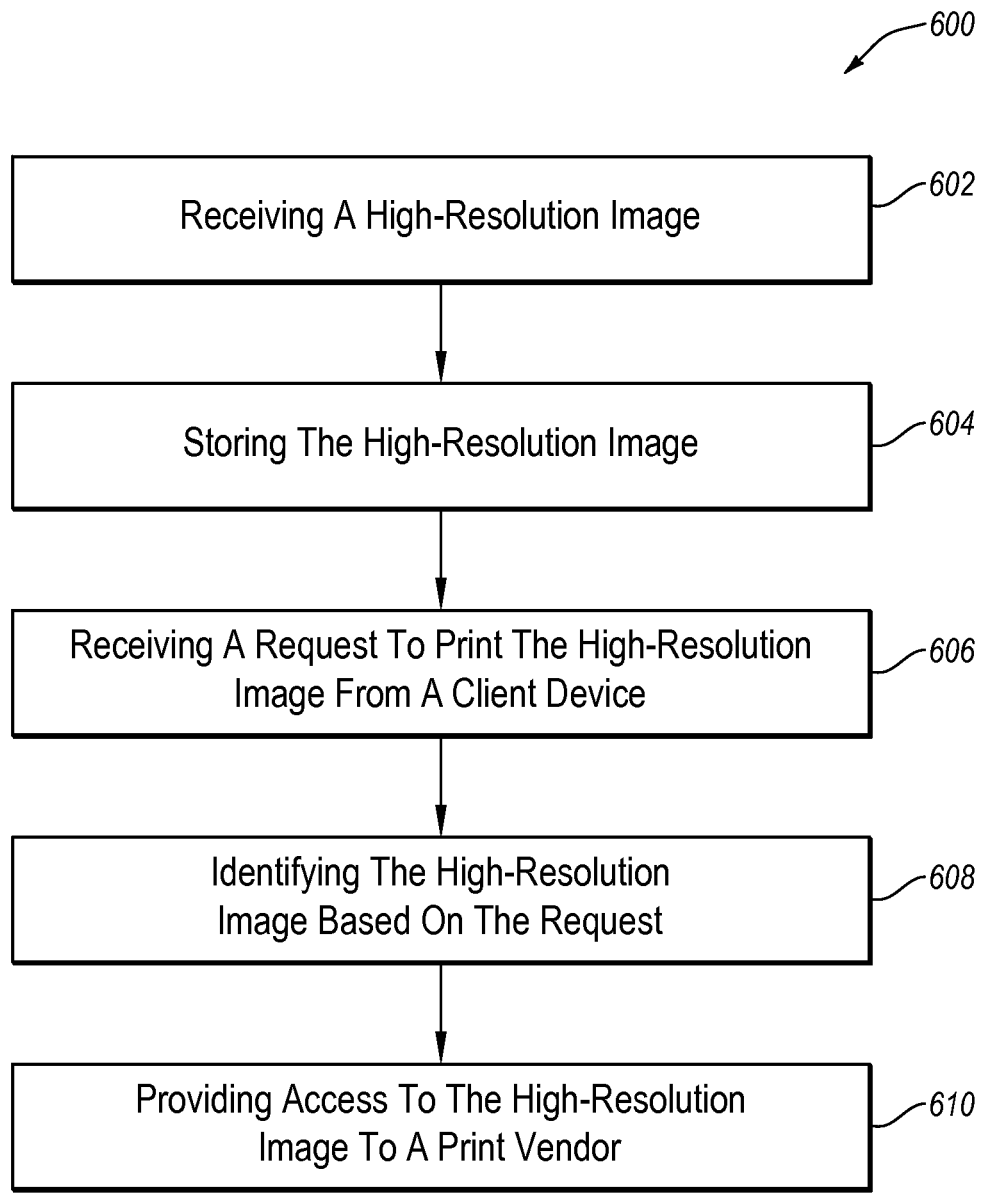
FIG. 6 illustrates a flowchart of a series of acts in a method of facilitating printing of images without requiring an upload of the images from devices requesting the printing of the images in accordance with one or more embodiments of the present invention.
Figure 7:
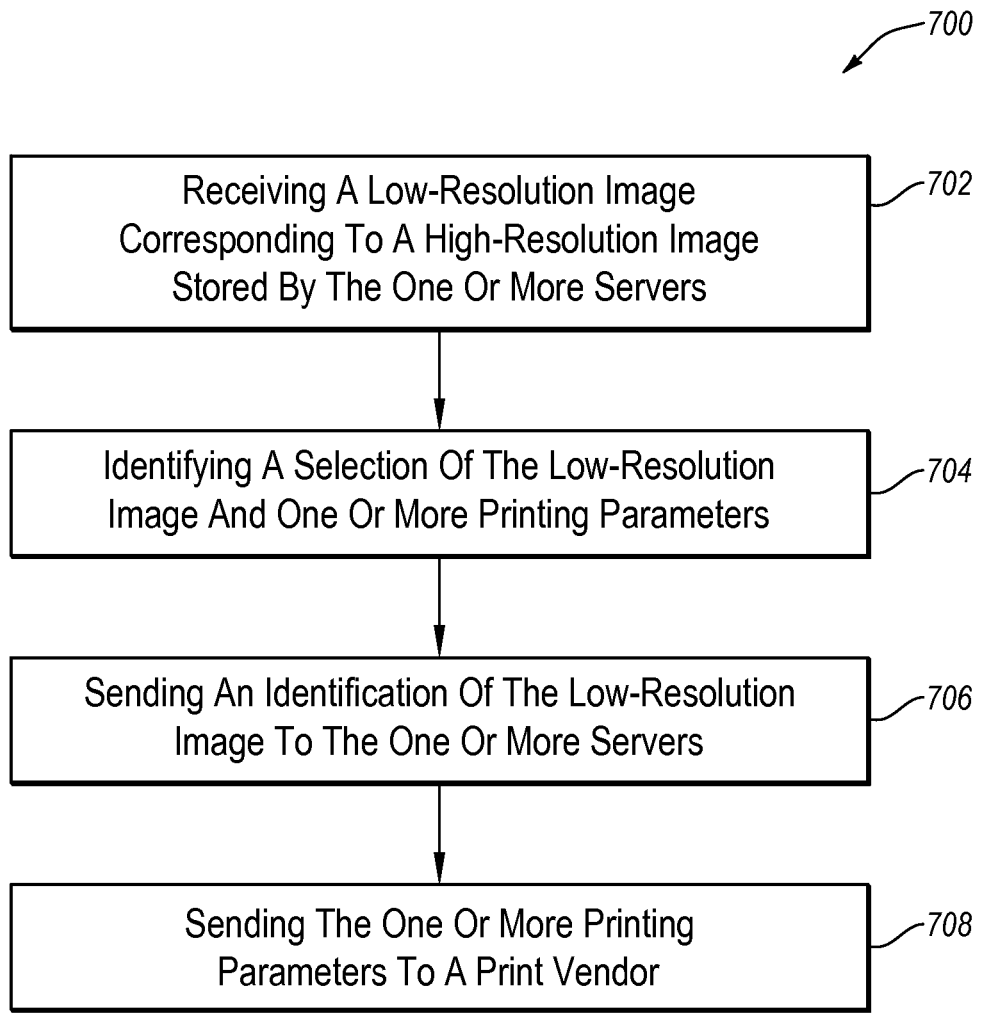
FIG. 7 illustrates a flowchart of a series of acts in another method of facilitating printing of images without requiring an upload of the images from devices requesting the printing of the images in accordance with one or more embodiments of the present invention.

FIGS. 1-5D, the corresponding text, and the examples, provide a number of different systems and devices for providing printing images without requiring an upload of the image from the device ordering the prints. In addition to the foregoing, embodiments of the present invention also can be described in terms of flowcharts comprising acts and steps in a method for accomplishing a particular result. For example, FIGS. 6 and 7 illustrate flowcharts of exemplary methods in accordance with one or more embodiments of the present invention. The methods described in relation to FIGS. 6 and 7 may be performed with less or more steps/acts or the steps/acts may be performed in differing orders. Additionally, the steps/acts described herein may be repeated or performed in parallel with one another or in parallel with different instances of the same or similar steps/acts.

FIG. 6 illustrates a flowchart of one exemplary method 600 of facilitating printing of images without requiring an upload of the images from devices requesting the printing of the images. The method 600 includes an act 602 of receiving a high-resolution image. In particular, act 602 can involve receiving, at one or more servers 101, a high-resolution image. For example, receiving the high-resolution image can involve receiving the high-resolution image from a first client device 102a at which the high-resolution image was captured.

As part of act 602, or as an additional act, the method 600 can include establishing a group 306 for sharing photos related to an event. The group 306 can include one or more participants. The first client device 102a can be associated with a participant in the group 306. The method 600 can further include sending a thumbnail 402 of a full-resolution image to a second client device 102b and other client devices associated with participants in the group 306 without sending the full-resolution image.

The method 600 also includes an act 604 of storing the high-resolution image. In particular, act 604 can involve storing, by the one or more servers 101, the high-resolution image. For example, storing the high-resolution image can involve storing the high-resolution on a server 101 accessible to one or more client devices 102a-102b.

FIG. 6 further illustrates that the method 600 includes an act 606 of receiving a request to print the high-resolution image. More specifically, act 606 involves receiving a request to print the high-resolution image from a client device 102b, the request comprising a selection of a low-resolution image 402 corresponding to the high-resolution image. For example, the selection of a low-resolution image 402 of the high-resolution image can involve a selection of a thumbnail 402, stored on a second client device 102a, of a full-resolution image stored on the one or more servers 101.

As illustrated by FIG. 6, the method 600 includes an act 608 of identifying the high-resolution image. In particular, act 608 can involve identifying the high-resolution image based on the request. Identifying the high-resolution image based on the request can involve identifying a full-resolution image stored on a server 101 based on a selection of a corresponding thumbnail 402 stored on a client device 102b.

In addition to the foregoing, method 600 includes an act 610 of providing access to the high-resolution image. More specifically, act 610 involves providing, by the one or more servers 101, access to the high-resolution image previously stored by the one or more servers 101 to a print vendor 108. For example, act 610 can involve associating the high-resolution image with a uniform resource locator that indicates a location of the high-resolution image, and sending the uniform resource locator associated with the high-resolution image to the print vendor 108. Alternatively, act 610 can involve associating a token with the high-resolution image, sending the token to the client device 102b in response to the request, and providing access to the high-resolution image to the print vendor 108 in response to receiving the token from the print vendor 108.

As part of act 610, or as an additional act, the method 600 can include modifying the high-resolution image. For example, the method 600 can involve determining a color profile associated with a printer at the print vendor 108, and modifying the high-resolution in accordance with the determined color profile. Providing access to the high-resolution image to the print vendor 108 can involve providing the modified high-resolution image to the print vendor 108.

FIG. 7 illustrates a flowchart of one exemplary method 700 of printing high-resolution images from devices without requiring the devices to upload the high-resolution images. The method 700 includes an act 702 of receiving a low-resolution image 402 corresponding to a high-resolution image stored by one or more servers 101. In particular, act 702 can involve receiving, from one or more servers 101, a low-resolution image 402 corresponding to a high-resolution image stored by the one or more servers 101. For example, act 702 can involve receiving a thumbnail 402, at a client device 102b, of a full-resolution image stored on a server 101.

The method 700 also includes an act 704 of identifying a selection of the low-resolution image 402 and a selection of one or more printing parameters. In particular, act 704 can involve identifying, by at least one processor, a selection of the low-resolution image 402, an identification of a print vendor, and one or more printing parameters. In particular, the image application 110 can identify or receive input from a user via one or more graphical user interfaces or iframes 300, 400, 501a-501d. For example, the image application can identify printing parameters such as a number of print outs, a size of a print out, or a delivery mechanism.

FIG. 7 further illustrates that the method 700 includes an act 706 of sending an identification of the low-resolution image 402 to the one or more servers. In particular, act 706 can involve sending an identification of the low-resolution image 402 and the print vendor 108 to the one or more servers 101 to request the one or more servers 101 to provide the high-resolution image to the print vendor 108. For example, the client device 102b can send a thumbnail 402 of a full-resolution image, or an identifier associated with the thumbnail 402, to the server 101 on which the full-resolution image is stored in a print request.

As illustrated by FIG. 7, the method 700 includes an act 708 of sending the one or more printing parameters to a print vendor 108. As part of act 708, or as an additional act, the method 700 can involve presenting an iframe 501a-501d of the print vendor 108 and sending the one or more printing parameters to the print vendor 108 via the iframe 501a-501d. Act 708 can further involve receiving a token from the one or more servers 101 associated with a location of the high-resolution image, and sending the token to the print vendor 108.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the invention can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network," such as network 104 of FIG. 1, is defined as one or more data links that enable the transport of electronic data between computer systems and/or modules and/or other electronic devices. Thus, the computing devices 102, image management system 106, and print vendor 108 may communicate using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, in-band and out-of-band signaling technologies, and other suitable communications networks and technologies.

In certain embodiments, the network 104, which may include one or more networks, including, but not limited to, wireless networks (Wi-Fi networks), (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the computing devices 102, image management system 106, and print vendor 108. Communications between the computing devices 102, image management system 106, and print vendor 108 may be transported using any one of the above-listed networks, or any combination or sub-combination of the above-listed networks.

When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the invention. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
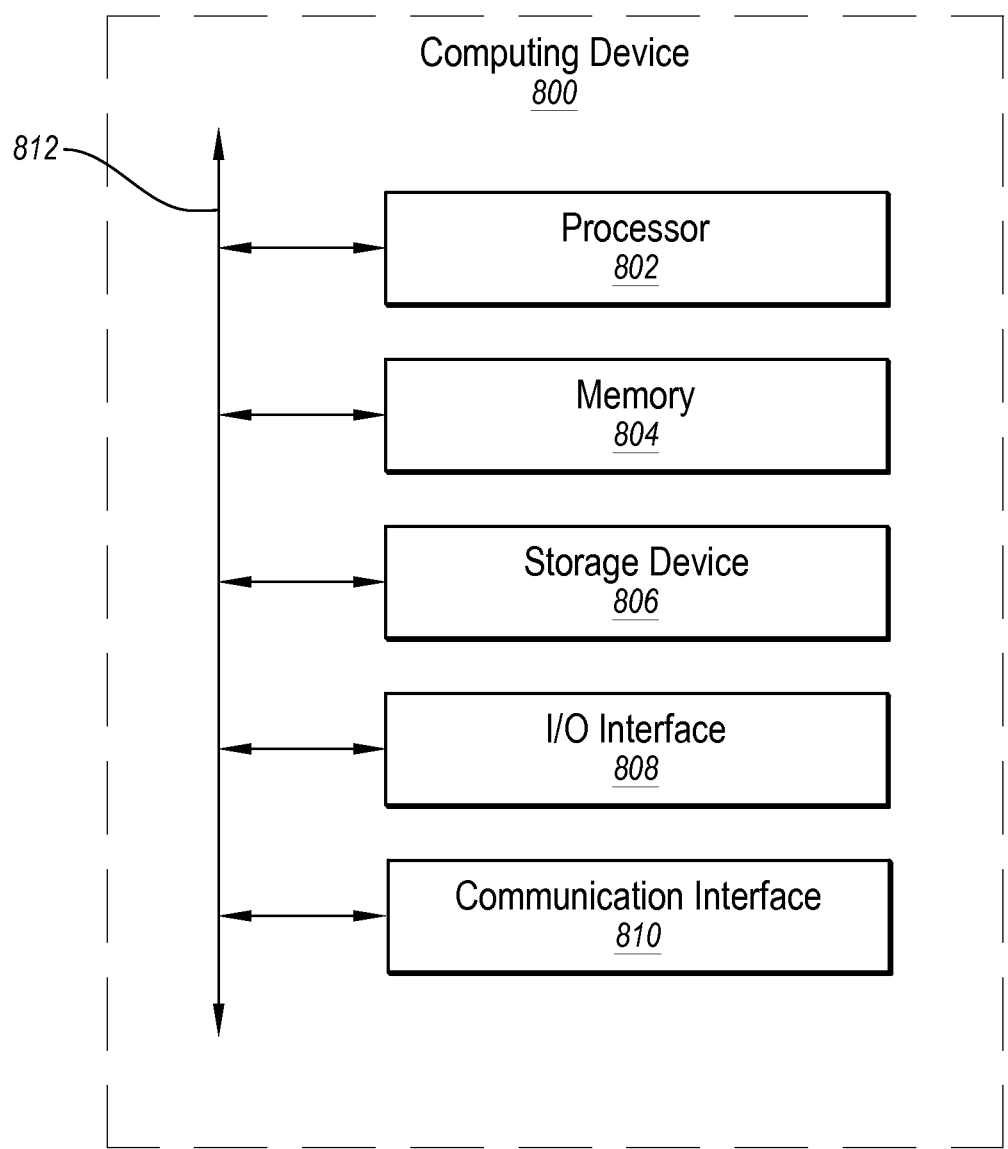
FIG. 8 illustrates a block diagram of a computing device in accordance with one or more embodiments of the present invention.

FIG. 8 illustrates, in block diagram form, an exemplary computing device 800 that may be configured to perform one or more of the processes described above. One will appreciate that the computing devices 102a, 102b, 300 (or even the server computing device 101) can comprise implementations of the computing device 800. As shown by FIG. 8, the computing device can comprise a processor 802, memory 804, a storage device 806, an I/O interface 808, and a communication interface 810. While an exemplary computing device 800 is shown in FIG. 8, the components illustrated in FIG. 8 are not intended to be limiting. Additional or alternative components may be used in other embodiments. Furthermore, in certain embodiments, a computing device 800 can include fewer components than those shown in FIG. 8. Components of computing device 800 shown in FIG. 8 will now be described in additional detail.

In particular embodiments, processor(s) 802 includes hardware for executing instructions, such as those making up a computer program. As an example and not by way of limitation, to execute instructions, processor(s) 802 may retrieve (or fetch) the instructions from an internal register, an internal cache, memory 804, or a storage device 806 and decode and execute them. In particular embodiments, processor(s) 802 may include one or more internal caches for data, instructions, or addresses. As an example and not by way of limitation, processor(s) 802 may include one or more instruction caches, one or more data caches, and one or more translation lookaside buffers (TLBs). Instructions in the instruction caches may be copies of instructions in memory 804 or storage 806.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 includes a storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to the computing device 800. In particular embodiments, storage device 806 is non-volatile, solid-state memory. In particular embodiments, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 800 also includes one or more input or output ("I/O") devices/interfaces 808, which are provided to allow a user to provide input to (such as user strokes), receive output from, and otherwise transfer data to and from the computing device 800. These I/O devices/interfaces 808 may include a mouse, keypad or a keyboard, a touch screen, camera, optical scanner, network interface, modem, other known I/O devices or a combination of such I/O devices/interfaces 808. The touch screen may be activated with a stylus or a finger.

The I/O devices/interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 810. As an example and not by way of limitation, computing device 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 800 may include any suitable communication interface 810 for any of these networks, where appropriate.

The computing device 800 can further include a bus 812. The bus 812 can comprise hardware, software, or both that couples components of computing device 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method of facilitating printing of images without requiring an upload of the images from devices requesting the printing of the images, comprising:
   receiving, at one or more servers, a high-resolution image from a first user mobile device;
   storing, by the one or more servers, the high-resolution image;
   sending, in response to receiving the high-resolution image, a low-resolution image corresponding to the high-resolution image to a second user mobile device;
   receiving a request to print the high-resolution image from the second user mobile device, the request comprising a selection of the low-resolution image corresponding to the high-resolution image;
   identifying the high-resolution image based on the request;
   associating an authentication token with the high-resolution image, the authentication token comprising a pointer to a cloud-based location of the high-resolution image;
   sending, in response to the request, the authentication token to the second user mobile device to provide to the print vendor;
   receiving the authentication token from the print vendor, the authentication token provided to the print vendor from the second user mobile device;
   authenticating the print vendor based on the authentication token; and
   providing, by the one or more servers, the print vendor access to the high-resolution image in response to receiving the authentication token from the print vendor and authenticating the print vendor.

2. The method as recited in claim 1, wherein the pointer to the cloud-based location of the high-resolution image is a uniform resource locator corresponding to the cloud-based location.

3. The method as recited in claim 2, further comprising:
   transferring the high-resolution image to the location indicated by the uniform resource locator corresponding to the cloud-based location; and
   deleting the high-resolution image from the cloud-based location indicated by the uniform resource locator after a predetermined amount of time.

4. The method as recited in claim 2, further comprising disabling the uniform resource locator after a predetermined amount of time.

5. The method as recited in claim 1, further comprising:
   modifying, by the one or more servers, the high-resolution image;
   wherein providing the print vendor access to the high-resolution image comprises providing the modified high-resolution image to the print vendor.

6. The method as recited in claim 5, further comprising determining a color profile associated with a printer at the print vendor;
   wherein modifying the high-resolution image comprises modifying the high-resolution image in accordance with the determined color profile.

7. The method as recited in claim 6, wherein modifying the high-resolution image comprises one or more of applying a red-eye reduction to the high-resolution image, de-blurring the high-resolution image, sharpening the high-resolution image, or cropping the high-resolution image.

8. The method as recited in claim 1, further comprising sending, in response to receiving the high-resolution image from the first user mobile device, a low-resolution image corresponding to the high-resolution image to the first user mobile device.

9. The method as recited in claim 1, further comprising:
   generating the low-resolution image from the high-resolution image; and
   sending the low-resolution image to the second client device.

10. The method as recited in claim 9, wherein:
    the high-resolution image comprises a full-resolution image; and
    the low-resolution image comprises a thumbnail of the full-resolution image.

11. The method as recited in claim 10, further comprising:
    establishing a group for sharing photos related to an event, the group including a first user of the first client device and a second user of the second client device; and
    sending the thumbnail of the full-resolution image to the first client device and the second client device based on the first user and the second user being participants in the group without sending the full-resolution image.

12. A system for facilitating printing of images without requiring an upload of the images from devices requesting the printing of the images, comprising:
    at least one server;
    at least one non-transitory computer readable storage medium storing instructions thereon, that when executed by at least one processor, cause the system to:
    receive a high-resolution image from a first user mobile device;
    store the high-resolution image at the at least one server;
    send, in response to receiving the high-resolution image, a low-resolution image corresponding to the high-resolution image to a second user mobile device;
    receive a request to print the high-resolution image from the second user mobile device, the request comprising a selection of the low-resolution image as an identification of the high-resolution image and an identification of a print vendor;
    associate an authentication token with the high-resolution image, the authentication token comprising a pointer to a cloud-based location of the high-resolution image;
    send, in response to the request, the authentication token to the second user mobile device to provide to the print vendor;
    receive the authentication token from the print vendor, the authentication provided to the print vendor from the second user mobile device; and
    authenticate the print vendor based on the authentication token; and
    provide the print vendor access to the high-resolution image in response to receiving the authentication token from the print vendor and authenticating the print vendor.

13. The system as recited in claim 12, further comprising instructions that when that when executed by the at least one processor, cause the system to provide the print vendor access to the high-resolution image by:
- transferring the high-resolution image to the cloud-based location in response to receiving the request to print the high-resolution image from the second user mobile device;
- generating a uniform resource locator that indicates the location of the high-resolution image; and
- sending the uniform resource locator as the authentication token to the second user mobile device to provide to the print vendor.

14. The system as recited in claim 12, further comprising instructions that when that when executed by the at least one processor, cause the system to:
- generate a low-resolution image from the high-resolution image received from the first user mobile device; and
- send the low-resolution image to the first user mobile device and the second user mobile device.

15. A method of printing high-resolution images from devices without requiring the devices to upload the high-resolution images, comprising:
- capturing, by a client device, a high-resolution image;
- uploading the high-resolution image to one or more servers;
- receiving, from the one or more servers, a low-resolution image corresponding to the high-resolution image stored by the one or more servers in response to uploading the high-resolution image;
- identifying, by at least one processor of the client device, a selection of the low-resolution image, an identification of a print vendor, and an indication of one or more printing parameters;
- receiving, from the one or more servers and in response to the selection of the low-resolution image, an authentication token associated with a location of the high-resolution image for authenticating with the one or more servers, the authentication token comprising a pointer to a cloud-based location of the high-resolution image;
- sending, via a network, the authentication token to the print vendor;
- sending an indication of the low-resolution image and the print vendor to the one or more servers to request the one or more servers to provide the high-resolution image to the print vendor in association with the authentication token; and
- sending the one or more printing parameters to the print vendor.

16. The method as recited in claim 15, wherein the printing parameters comprise one or more of a number of print outs, a size of a print out, or a delivery mechanism.

17. The method as recited in claim 15, further comprising presenting an iframe of the print vendor and sending the one or more printing parameters to the print vendor via the iframe.

18. The method as recited in claim 2, further comprising disabling the uniform resource locator after a predetermined number of attempts by the print vendor to access the high-resolution image.

* * * * *